United States Patent [19]

McIlroy et al.

[11] 3,959,068

[45] May 25, 1976

[54] PROCESS AND APPARATUS FOR RECOVERY OF SULFUR FROM A POLYSULFIDE PULPING OPERATION

[75] Inventors: Robert A. McIlroy; Robert E. Matty; Walter C. Lapple, all of Alliance, Ohio

[73] Assignee: The Babcock & Wilcox Company, New York, N.Y.

[22] Filed: Oct. 24, 1974

[21] Appl. No.: 517,713

[52] U.S. Cl. .............................. 162/17; 162/30 K; 162/51; 162/240; 423/207; 423/561; 423/571; 423/578 R
[51] Int. Cl.² ...................... D21C 3/24; D21C 11/12
[58] Field of Search ............... 162/17, 30, 44, 45, 162/237, 240, 51; 210/63; 423/207, 571, 578, 561; 159/47 WL

[56] References Cited
UNITED STATES PATENTS

| | | | |
|---|---|---|---|
| 1,699,808 | 1/1929 | Rinman | 423/561 |
| 1,852,264 | 4/1932 | Rinman | 162/30 R |
| 2,362,670 | 11/1944 | Schulze | 423/561 |
| 2,416,663 | 2/1947 | Menefee et al. | 423/578 |
| 3,073,672 | 1/1963 | Cederquist | 162/30 |
| 3,296,064 | 1/1967 | Cann | 162/30 |
| 3,560,329 | 2/1971 | Nelson et al. | 162/30 |
| 3,650,889 | 3/1972 | Fogman et al. | 162/30 |

*Primary Examiner*—S. Leon Bashore
*Assistant Examiner*—Peter F. Kratz
*Attorney, Agent, or Firm*—Joseph M. Maguire; Vincent M. Fazzari

[57] ABSTRACT

A new chemical recovery process and apparatus for a polysulfide pulping system is described wherein sulfur is recovered from the weak black liquor and is returned to the process, along with makeup sulfur, to reconstitute the polysulfide solution.

After the polysulfide digestion, the spent liquor is contacted with ferric oxide $Fe_2O_3$ whereby ferrous sulfide, FeS, is formed. After separation of the ferrous sulfide from the remaining liquid, the ferrous sulfide is oxidized to form elemental sulfur, and ferric oxide. After the melting of the sulfur and the separating of the products, the sulfur can be returned to the Sulfur Dissolving Tank wherein, along with makeup sulfur as required, the white liquor from the causticizing plant can be treated to form the polysulfide liquor for digestion. The ferric oxide can be reused for contacting the black liquor to form ferrous sulfide. The resulting smelt of reduced sulfidity from the recovery furnace can be reprocessed to form the white liquor.

20 Claims, 1 Drawing Figure

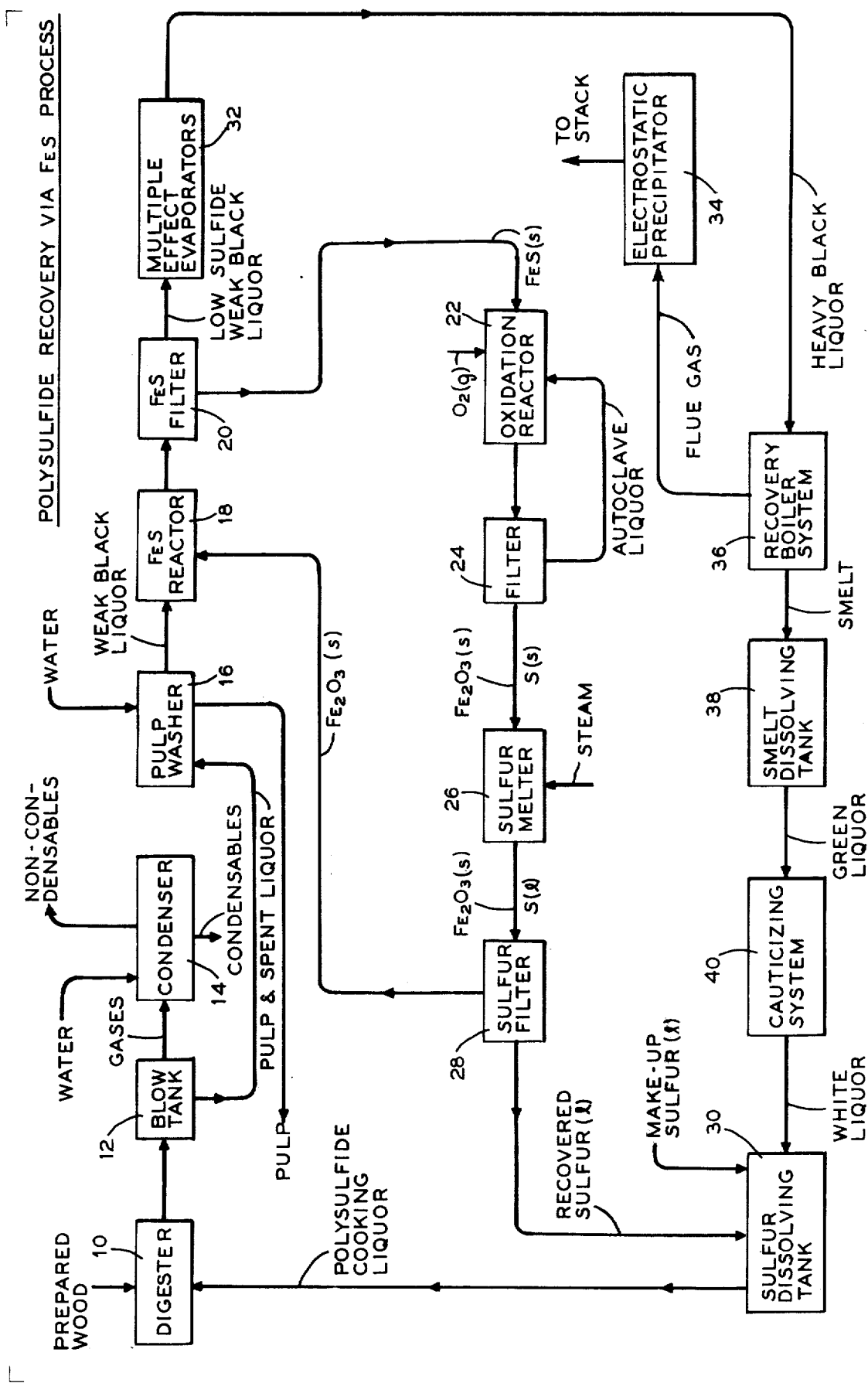

PROCESS AND APPARATUS FOR RECOVERY OF SULFUR FROM A POLYSULFIDE PULPING OPERATION

BACKGROUND OF THE INVENTION

The pulping of wood by the polysulfide process has attracted much attention in the industry over the last few years due to a higher yield of pulp from wood than obtainable by the Kraft or other conventionally used pulping processes. The increasing cost of wood, which is the major cost in pulping, has forced the industry to thoroughly evaluate any alternative which promises a higher yield. Such a benefit is not without some drawback and in this instance it takes the form of increased requirements of sulfur to form the sodium polysulfide compound usually designated as $Na_2S_x$ in the cooking liquor. The effects of the additional sulfur requirements do not show up merely in increased sulfur costs, but are manifested in the form of increased corrosion problems, smelt conditions with increased potential for explosions, and a number of costly pollution problems. Such side effects, coupled with the absence of an inexpensive recovery system for the sulfur have been inhibiting factors in the acceptance of the polysulfide pulping process as a viable alternative to conventional systems now employed.

SUMMARY OF THE INVENTION

The present invention is directed to a high sulfidity pulping process such as the polysulfide process and is more specifically related to the recovery of sulfur from the spent cooking liquor prior to entry into the chemical recovery furnace. Further objects of the invention are achieved by sulfur removal at this point. One such objective is the reduction of the sulfidity of the smelt. Such reduction reduces the probability of smelt water explosions. A further object of the invention is the reduction of the corrosive properties of the compounds. This allows for relatively inexpensive conversions from a process such as Kraft to a polysulfide process since only minor changes in materials of construction would be necessitated. Furthermore, the life of the equipment is extended due to the lower corrosion rates. A further and most desirable objective of the invention is the reduction of pollution problems which are attendant to a polysulfide or high sulfur process. Still another objective of the invention is the recovery of chemicals useful in the cooking liquor. The sulfur removal is achieved by reaction of the spent liquor with an insoluble metallic oxide such as $Fe_2O_3$ to form an insoluble sulfide which is subsequently oxidized to elemental sulfur and an oxygen bearing metallic compound. A more fully understandable recitation follows.

BRIEF DESCRIPTION OF THE DRAWINGS

The drawing is a schematic flow diagram showing that part of the process employing the present invention.

DESCRIPTION OF THE PREFERRED EMBODIMENT

The present invention is of use in a polysulfide pulping process as depicted in the drawing but as will be seen, can be used in other pulping processes, which are considered in the industry as having a high sulfur content in the cooking or spent liquors.

Wood, having undergone preparation for the pulping process is introduced into the digester 10 where it is intimately contacted by what is known in the Art as the cooking liquor. It is this alkaline cooking liquor which contains the sulfur bearing compounds. The typical constituents in the cooking liquor for a polysulfide process are NaOH, $Na_2S$, $Na_2SO_4$, $Na_2CO_3$, S and $H_2O$. The sulfur and $Na_2S$ combine to form sodium polysulfide which is usually designated as $Na_2S_x$, where $x$ may have a value between 1 and about 5. Polysulfide sulfur is present in the cooking liquor in amounts varying from about 1-7 percent by weight of the wood on a dry basis. The purpose of this digestion step is to remove lignin from the wood. This is accomplished by the chemical attack on the lignin by the active compounds in the cooking liquor. Such chemical interaction not only partially depletes the cooking liquor, but also generates other products of reactions such as $H_2S$. The digestion products are then passed to a blow tank 12 wherein gaseous products are vented. These escaping gases are passed through a condenser 14 where the condensables are condensed out. The non-condensables components are vented to atmosphere or can be exposed to further chemical treatment. Meanwhile, the pulp-liquor mixture from the blow tank 12 is directed to a washing system in which the partially depleted cooking liquor is washed from the pulp. Such washing devices can be washing pans or diffusers or a multistage rotary drum filter 16. The flow of the wash water is generally counter-current to the operation. The filtrate (black liquor) contains lignin degradation products and spent inorganic cooking chemicals. The solids content of this stream may be as high as 10-15 percent by weight and be at a temperature of 180° - 200°F. At this point in the operation, the amount of polysulfide sulfur remaining in the black liquor is insufficient for reuse in the digestor 10. However, the chemical content of the black liquor justifies recovery. The further observation may be made, that removal of sulfur at this point in the process can result in savings in operational and equipment costs of the recovery system not only from a maintenance point of view, but also from a capital expenditure point of view. The weak black liquor is contacted with $Fe_2O_3$ in the mixer-reactor 18. The reactor is maintained at a temperature of approximately 180°F. The reaction mixture is agitated for about 90 minutes. It is believed that the following reaction takes place in the reactor at essentially atmospheric pressure:

$$Fe_2O_3 + 3\ NaHS \rightarrow 2\ FeS + 3\ NaOH + S$$

While in accordance with the equation above, only a stoichiometric amount of $Fe_2O_3$ is required, it is advisable for this component to be present in slight excess. While in the preferred embodiment of the invention, the compound used is ferric oxide, in practice other metallic oxides, hydroxides, or hydrated oxides which have a corresponding insoluble sulfide under the process conditions may be used. Oxides, hydroxides or hydrated oxides of nickel, cobalt, zinc, lead and copper are also useful in the practice of this invention. Iron oxide is chosen because of its compatability with a Kraft type process, and because the resulting sulfide compound is relatively insoluble and therefore easily separated. Such separation may be accomplished by settling, filtration or by centrifugal means. In the preferred embodiment of this invention such separation is carried out by a continuous filtering device 20. In any case, the solid phase can now be put into a slurry and fed into an oxidation reactor 22 or be introduced into the reactor as a solid and the liquid added later. The oxidation reactor 22 is operated at a pressure of 100–150 psig, and a temperature of about 210° – 250°F. Care must be taken to overcome the increased pressure in transferring the solid or slurry into this pressure vessel. This pressure is maintained by introduction of high pressure gas containing uncombined oxygen wherein the following reaction takes place:

$$4 \text{ FeS} + 3 \text{ O}_2 \rightarrow 2 \text{ Fe}_2\text{O}_3 + 4 \text{ S}$$

Good dispersion of the oxygen containing gas and thorough mixing of the gas and ferrous sulfide are required for rapid reaction. The dispersion and mixing can be achieved by use of a sparge ring and a turbine type impeller. The reactor may be equipped with internal heating or cooling tubes so as to maintain the temperature of the reaction mixture. Reaction time requirements vary depending on whether the gas is air or oxygen. For example, it was found that when oxygen gas was used at 150 psig, 80 percent conversion was attainable for a 90 minute reaction time. Experiment has indicated that dropping the pressure of the oxygen to 30 psig showed no decrease in conversion for the same reaction time where there is good agitation. However, when air was used as the oxygen containing gas, the conversion dropped to 60 percent for a 90 minute reaction time.

At the end of the reaction period, both sulfur and ferric oxide will exist as solids and can be separated from the liquid phase by a centrifuge or filter 24. The liquid phase can be recycled back to the oxidation reactor 22. The filtered solid phase which contains elemental sulfur and iron oxide is now introduced into a sulfur melting device 26 wherein heat is added to the solid phase so as to raise the temperature of the mixture to in excess of 240°F which is the melting point of sulfur. The iron oxide which has a melting point of 2840°F is maintained in the solid state. The heat is preferably added by an indirect heating means so as to minimize the possibility of formation of sulfur dioxide. The heat transfer medium may be heated air, steam or any other suitable heat transferring fluid. This liquid-solid mixture of sulfur and iron oxide is now directed to a sulfur fiter 28 which separates the solid and liquid phases. The metallic oxide can now be recovered and reused in the mixer reactor 18 to form the insoluble metallic sulfide as before. The recovered sulfur can now be reintroduced into the process as shall more fully be described subsequently.

Simultaneously with the above processing of the ferrous sulfide compound, the low sulfide weak black liquor has entered a multiple effect evaporator system 32. Such a system can have as many as 5 or 6 long-tube, vertical-film type evaporators in series. A vacuum of 26–28 in. Hg. is usually applied to the evaporator wherein water is driven off by the counter-current flow of steam around the tubes thus concentrating the black liquor to about 60—65 percent solids by weight. The black liquor then enters a storage tank (not shown) wherein additional collected solids may be added to the liquor. In a polysulfide process where the pulp yield is high, addition of combustible material to the black liquor may be necessary to increase the B.T.U. value of the mixture. The black liquor may then be pumped to a direct contact evaporator (not shown) for further concentration but such evaporator may be omitted as in the newer systems. Where such an evaporator is already present in the system, the heat source may be the flue gases off the recovery furnace located in the recovery boiler system 36. The solids content of the heavy black liquor leaving the evaporator may be for example, 65–70 percent by weight.

The heavy black liquor is directed to a chemical recovery boiler system 36 wherein the heavy black liquor is incinerated resulting in a smelt, rich in sodium compounds, and a flue gas. This incineration has decomposed and driven off the organic matter (in the heavy black liquor) which had been introduced in the digestor 10. The resulting smelt has a sulfidity of less than 25 percent which may lower the probability of a "smelt-water explosion" should a leak in the furnace water tubes develop. Another indication of the effectiveness of the prior removal of the sulfur shows up in a marked decrease in SO$_2$ content of the flue gases which would eliminate air pollution equipment requirements for the recovery furnace in processes with a high level of polysulfide sulfur. In addition, chemical attack of the furnace and other following equipment is greatly reduced. The flue gases may go on for further treatment in a device such as an electrostatic percipitator 34.

The smelt, which is in a molten state, is tapped from the bottom of the recovery furnace, in the recovery boiler system 36 and is dissolved in an aqueous solution in the smelt dissolving tank 38. This smelt is a mixture of mainly sodium carbonate (Na$_2$CO$_3$) and sodium sulfide (Na$_2$S). Prior to the actual dissolving, the smelt is dispersed so it doesn't explode on contact with the cool dissolving liquor. This produces what is referred to as a green liquor. This green liquor is usually clarified in a clarifier (not shown) to remove impurities picked up in the smelting operation. The clarified green liquor then moves on to the causticizing system 40 wherein slaked lime is added to react with the sodium carbonate to form sodium hydroxide and calcium carbonate. Since the sodium sulfide is not involved in the reaction, the resulting sodium hydroxide and remaining sodium sulfide will be in a desirable proportion. The calcium carbonate is not desirable in the cooking liquor so it may be separated out by decanters (not shown). This calcium carbonate may then be fed to a lime kiln (not shown) where it may be converted to lime and carbon dioxide. The lime may be reused in the causticizing system.

The liquor leaving the causticizing system is referred to as the white liquor. This white liquor is directed to a sulfur dissolving tank 30. It is this tank to which the recovered sulfur from the sulfur filter has been directed. Additional makeup sulfur is also introduced into tank 30 wherein the polysulfide cooking liquor is prepared according to the following reaction:

$$\text{Na}_2\text{S} + (X-1)\text{S} \rightarrow \text{Na}_2\text{S}_x$$

Thus it will be seen that herein is disclosed a novel and useful process for the recovery of sulfur from the spent cooking liquor of a polysulfide pulping process. The removal of the sulfur at that stage in the process as described above not only reduces the cost of chemical makeup but minimizes pollution problems, corrosion and maintenance problems, and probability of smelt water explosions. As is evident, such process is also useful with other cellulosic materials.

Furthermore, while in the preferred embodiment of the invention terminology has been used so as to describe the polysulfide version of the Kraft process, such invention as disclosed herein can be used in any pulping process wherein the cooking liquor is of the "high sulfur" variety.

While in accordance with the provisions of the statutes we have illustrated and described herein the best form and mode of operation of the invention now known to us, those skilled in the art will understand that certain features of our invention may sometimes be used to advantage without a corresponding use of other features.

We claim:

1. In a high sulfidity chemical pulping process wherein cellulosic material is digested in a cooking liquor bearing sulfur compounds, forming a pulp and residual cooking liquor, a process for chemical recovery wherein the residual cooking liquor is washed from the pulp, concentrated and then incinerated to recover chemicals contained therein, the improvement which comprises:
    a. Reacting the residual cooking liquor with a metallic oxygen bearing compound to form a metallic sulfur bearing compound in the residual cooking liquor and then
    b. Separating the metallic sulfur bearing compound from the residual cooking liquor and then concentrating and incinerating the separated residual cooking liquor.

2. A process for chemical recovery as in claim 1 wherein said metallic oxygen bearing compound is a metallic oxide.

3. A process for chemical recovery as in claim 1 wherein said metallic oxygen bearing compound is a metallic hydroxide.

4. A process for chemical recovery as in claim 1 wherein said metallic oxygen bearing compound is a hydrated metallic oxide.

5. A process for chemical recovery as in claim 1 wherein said metallic oxygen bearing compound is selected from the group consisting of ferric oxide, nickel oxide, cobalt oxide, zinc oxide, lead oxide, and copper oxide.

6. A process for chemical recovery as in claim 1 wherein said metallic oxygen bearing compound is selected from the group consisting of ferric hydroxide, nickel hydroxide, cobalt hydroxide, zinc hydroxide, lead hydroxide, and copper hydroxide.

7. A process for chemical recovery as in claim 1 wherein said metallic oxygen bearing compound is a hydrated nickel oxide.

8. A method of recovering chemicals from pulp residual cooking liquor obtained in the digestion of cellulosic materials in a high sulfide bearing cooking liquor process comprising:
    a. Reacting the pulp residual cooking liquor with a metallic oxygen bearing compound to convert some of the soluble sulfide compounds in the pulp residual cooking liquor to insoluble metallic sulfur bearing compounds;
    b. Separating prior to incineration the insoluble metallic sulfur bearing compounds from the pulp residual liquor;
    c. Concentrating the remaining pulp residual liquor to form a concentrated residual liquor;
    d. Incinerating the concentrated residual liquor to produce a smelt with a reduced sulfidity;
    e. Processing the smelt to form a pulp cooking liquor; and simultaneously and separately
    f. Oxidizing the separated insoluble metallic sulfur bearing compounds so as to form elemental sulfur and the metallic oxygen bearing compound;
    g. Separating the elemental sulfur and metallic oxygen bearing compound from a remaining solution; then
    h. Heating the elemental sulfur and the metallic oxygen bearing compound so as to change the elemental sulfur to the molten state; and
    i. Separating the molten elemental sulfur from the metallic oxygen bearing compound.

9. A method as recited in claim 8 wherein the separated molten sulfur is added to the processed smelt to form a polysulfide cooking liquor.

10. A method as recited in claim 8 wherein the metallic oxygen bearing compound is a metallic oxide.

11. A method as recited in claim 8 wherein the metallic oxygen bearing compound is a metallic hydroxide.

12. A method as recited in claim 8 wherein the metallic oxygen bearing compound is a hydrated metallic oxide.

13. A method as recited in claim 10 wherein the metallic oxygen bearing compound is selected from the group consisting of ferric oxide, nickel oxide, cobalt oxide, zinc oxide, lead oxide, and copper oxide.

14. A method as recited in claim 11 wherein the metallic oxygen bearing compound is selected from the group consisting of ferric hydroxide, nickel hydroxide, cobalt hydroxide, zinc hydroxide, lead hydroxide, and copper hydroxide.

15. A method as recited in claim 12 wherein the metallic oxygen bearing compound is a hydrated nickel oxide.

16. A method as recited in claim 8 wherein said step of separating the metallic sulfur bearing compound from the pulp residual liquor comprises filtering said metallic sulfur bearing compound from the pulp residual liquor.

17. A method as recited in claim 8 wherein the step of oxidizing the separated metallic sulfur bearing compound is accomplished by a gas containing uncombined oxygen selected from the group consisting of air and oxygen.

18. A method as recited in claim 8 wherein the step (g) of separating the elemental sulfur comprises filtering the elemental sulfur and the metallic oxygen bearing compound from the remaining solution.

19. A method as recited in claim 8 wherein said step (i) of separating the elemental sulfur in the molten state from the metallic oxygen bearing compound comprises filtering the metallic oxygen bearing compound from the molten elemental sulfur.

20. Apparatus for recovering chemicals from pulp residual liquor obtained in the digestion of cellulosic materials in a high sulfide cooking liquor process comprising contacting means for contacting the pulp residual liquor with a metallic oxygen bearing compound to convert some of the sulfide bearing compounds in the liquor to metallic sulfur bearing compounds, separating means following the contacting means for separating the metallic surfur bearing compounds from the pulp residual liquor, concentrating means for concentrating the pulp residual liquor from the separating means, incinerating means for incinerating the concentrated pulp residual liquor from the concentrating means to produce a smelt with reduced sulfidity, processing means for processing the smelt formed in the incinerating means to form a cooking liquor, regeneration means for simultaneously and separately oxidizing the separated metallic sulfur bearing compounds from the separating means to form elemental sulfur and said metallic oxygen bearing compound, and a remaining solution, second separating means for separating the elemental sulfur and metallic oxygen bearing compound from the remaining solution, heating means for changing the elemental sulfur from the second separating means to the molten state while maintaining the metallic oxygen bearing compound in the solid state, third separating means for separating the molten sulfur from the solid metallic oxygen bearing compound, and means for adding the molten elemental sulfur from the third separating means to the processed smelt from the incinerating means.

* * * * *